April 6, 1926.  T. J. OXNER  1,579,886
CHALK LINE SPOOL
Filed Nov. 19, 1923
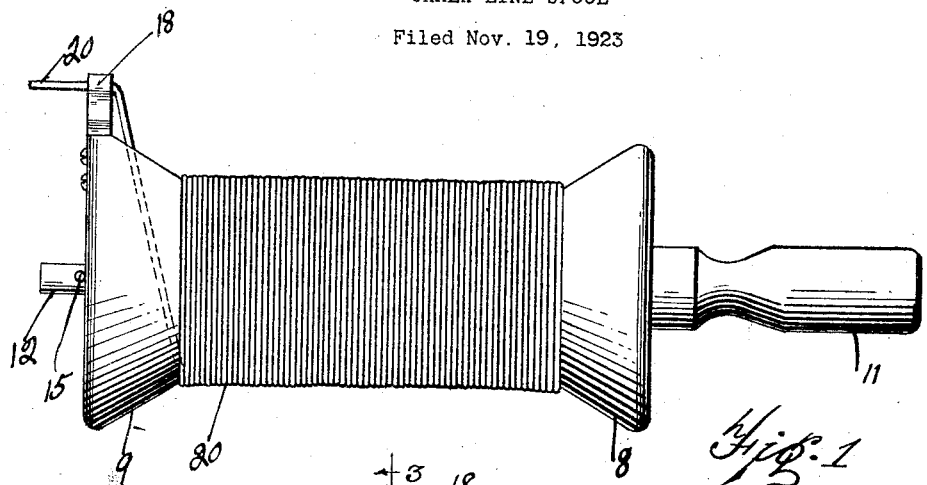
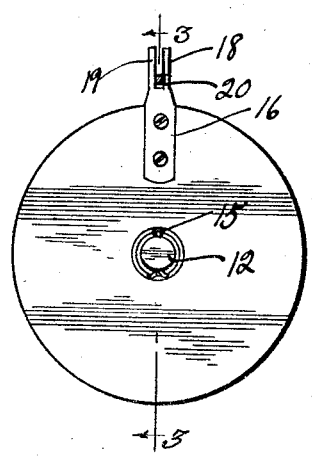
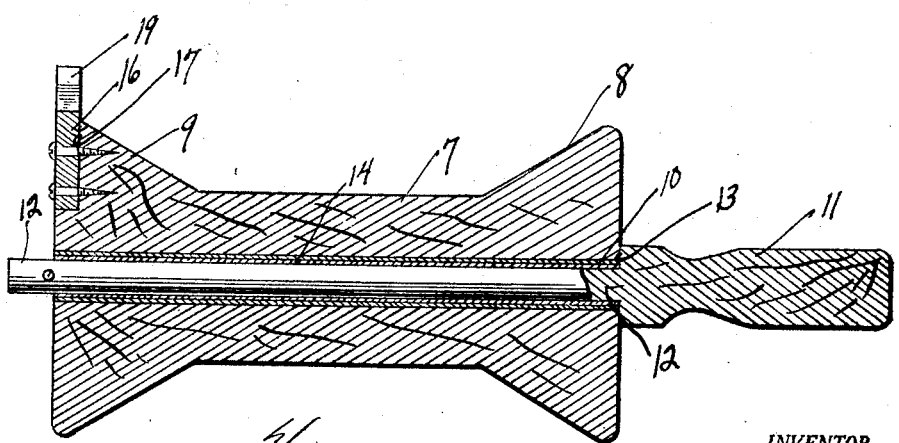
INVENTOR.
Theodore J. Oxner
BY
ATTORNEY.

Patented Apr. 6, 1926.

1,579,886

UNITED STATES PATENT OFFICE.

THEODORE J. OXNER, OF DETROIT, MICHIGAN.

CHALK-LINE SPOOL.

Application filed November 19, 1923. Serial No. 675,582.

*To all whom it may concern:*

Be it known that I, THEODORE J. OXNER, a citizen of the United States, residing at Detroit, in the county of Wayne and State of Michigan, have invented a new and useful Improvement in a Chalk-Line Spool, of which the following is a specification.

My invention relates to a new and useful improvement in a chalk line spool for winding the chalk line which is used by mechanics such as brick layers, stone masons, carpenters and the like.

An object of the invention is the provision of a chalk line spool which will be simple in structure, economical of manufacture and highly efficient in use such as to provide means for quickly and easily winding and unwinding the chalk line.

Another object of the invention is the provision of means on the spool for locking the line against unwinding after a sufficient length has been unwound.

Other objects will appear hereinafter.

The invention consists in the combination and arrangement of parts hereinafter described and claimed.

The invention will be best understood from a reference to the accompanying drawings which form a part of this specification and in which, Fig. 1 is a side elevational view of the invention, Fig. 2 is a front elevational view of the invention, and, Fig. 3 is a sectional view taken on substantially line 3—3 of Fig. 2.

The invention in its preferred form comprises a spool 7 having flaring ends 8 and 9. The spool may be made in various sizes depending on the amount of cord which is intended to be used. The spool is provided with a bore which extends throughout its length and positioned within said bore is a bushing 10. A handle 11 is provided for insertion into said bore said handle 11 having a reduced portion 12 so as to provide a shoulder 13 which is adapted to engage the face of the spool end. A bushing 14 is mounted on the reduced portion 12, which engages against the bushing mounted in the spool, thus relieving the friction to considerable extent. A cotter pin 15 is projected through an opening formed in the portion 12 to prevent its undue withdrawal from the bore of the spool.

A recess 16 is formed in one end of the spool in which is positioned a metallic member 17 which projects beyond the periphery of the end of the spool and is bifurcated at its upper end to provide two arms 18 and 19 with a space between the same to provide for the reception of the cord 20 which is wound on the spool.

In use it is necessary to tie the end of the cord to the point of commencement after which the operator may travel along with the spool in his hand, held by the handle 11. The cord will then unwind and when a proper amount of cord is unwound the cord may then be slipped into a space between the bifurcations where it will be held fast, this space being of such width that the placing of the cord therein will effect a springing apart of the bifurcations slightly so as to present a pressure on the cord. In this way further winding from the spool is prevented and the spool may then hang from the point of attachment of the cord to the material of space worked over. In this way it is not necessary to make any hitch around the spool to prevent an unwinding of the cord.

While I have illustrated and described the preferred form of structure I do not wish to limit myself to the precise form of structure shown but desire to avail myself of such variations and modifications as come within the scope of the appended claims.

Having thus described my invention what I claim as new and desire to secure by Letters Patent is:

1. In a chalk line spool, a spool portion having a bore formed therein and provided with a radially extending recess, in one of the end faces adjacent the periphery thereof; a stem for insertion into said bore; a handle portion on said stem; and a keeper mounted in said recess, the outer face of said keeper lying flush with said end face and projecting beyond the periphery thereof, said projecting portion of said keeper being bifurcated and adapted for the reception, between said bifurcations, of a cord wound on said spool.

2. In a chalk line spool, a spool portion having a bore formed therein, and provided with a radially extending recess on one of the end faces; a stem adapted for insertion into said bore; a handle portion on said stem, said stem being rotatable relatively to said spool; and means mounted in said recess, having its outer face flush with said end face, and projecting beyond the periphery thereof, for engaging fixedly with said outwardly projecting portion, a cord on said spool.

3. In a chalk line spool, a spool portion having an axial bore formed therein, and provided on one of its end faces with a radially extending recess; a stem projected through said bore for providing a shaft on which said spool is rotatable, said stem projecting beyond the ends of said spool; a pin projecting through one of the projecting ends of said stem; an enlarged handle forming portion on the opposite end of said stem, said pin and said handle forming portion limiting longitudinal movement of said spool on said stem; a keeper mounted in said recess, the outer face of said keeper lying flush with said face, said keeper projecting radially beyond the periphery of said face, the projecting end of said keeper being bifurcated and adapted for reception between the bifurcations, in clamping relation, a cord wound on said spool, said recess being in the end of said spool opposite said handle.

In testimony whereof I have signed the foregoing specification.

THEODORE J. OXNER.